(12) United States Patent
Sumioka et al.

(10) Patent No.: US 7,706,243 B2
(45) Date of Patent: Apr. 27, 2010

(54) METHOD AND APPARATUS FOR REPRODUCING OPTICAL INFORMATION

(75) Inventors: Jun Sumioka, Kawasaki (JP);
Masakuni Yamamoto, Yamato (JP);
Kaoru Okamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 11/622,765

(22) Filed: Jan. 12, 2007

(65) Prior Publication Data

US 2007/0177478 A1 Aug. 2, 2007

(30) Foreign Application Priority Data

Feb. 2, 2006 (JP) ............................. 2006-025596

(51) Int. Cl.
*G11B 7/24* (2006.01)

(52) U.S. Cl. .............. 369/275.4; 369/44.23; 369/44.26; 369/47.1; 369/59.23

(58) Field of Classification Search .............. 369/59.23, 369/47.53, 59.11, 103, 275.4, 44.23, 44.26, 369/53.2
See application file for complete search history.

(56) References Cited

U.S. PATENT DOCUMENTS

| | | | | |
|---|---|---|---|---|
| 5,048,003 A * | 9/1991 | Baggen et al. | ............ | 369/59.24 |
| 5,425,010 A * | 6/1995 | Rokutan | .................. | 369/44.26 |
| 5,555,231 A | 9/1996 | Yamamoto | | |
| 6,456,578 B2 * | 9/2002 | Iwata et al. | ................ | 369/53.2 |
| 6,714,508 B1 * | 3/2004 | Spruit et al. | ............ | 369/275.4 |
| 7,142,484 B2 * | 11/2006 | Ando et al. | ............... | 369/44.23 |
| 7,224,645 B2 * | 5/2007 | Ando et al. | ............... | 369/44.23 |
| 7,382,715 B2 * | 6/2008 | Hirai | ........................ | 369/275.4 |
| 7,573,798 B2 * | 8/2009 | Yamamoto et al. | ....... | 369/59.23 |
| 2002/0191512 A1 * | 12/2002 | Arioka et al. | ............ | 369/47.53 |
| 2004/0160891 A1 * | 8/2004 | Spruit et al. | ............ | 369/275.4 |
| 2005/0002285 A1 * | 1/2005 | Ando et al. | ............... | 369/44.14 |
| 2005/0195730 A1 * | 9/2005 | Maegawa | ................. | 369/275.4 |
| 2005/0213462 A1 * | 9/2005 | Maegawa | ................. | 369/59.11 |
| 2006/0109769 A1 * | 5/2006 | Yamamoto et al. | .......... | 369/103 |
| 2006/0280069 A1 | 12/2006 | Yamamoto et al. | ......... | 369/47.1 |
| 2007/0025217 A1 | 2/2007 | Miyaoka et al. | .......... | 369/53.34 |
| 2007/0091759 A1 | 4/2007 | Yamamoto et al. | ....... | 369/59.11 |
| 2007/0171800 A1 | 7/2007 | Okamoto et al. | ........... | 369/59.1 |
| 2007/0177478 A1 | 8/2007 | Sumioka et al. | .......... | 369/59.15 |

FOREIGN PATENT DOCUMENTS

| | | |
|---|---|---|
| JP | 5-128530 | 5/1993 |
| JP | 2006-236441 | 9/2006 |

* cited by examiner

*Primary Examiner*—Thuy N Pardo
(74) *Attorney, Agent, or Firm*—Fitzpatrick, Cella, Harper & Scinto

(57) ABSTRACT

An optical information reproducing method capable of determining multi-level information with high precision, and an apparatus for the method. Specifically, a cell having a reduced multi-level is provided in a portion of a data region to perform the level correction or automatic gain control. For example, a cell recorded with an M-value for each group including a plurality of cells, each of which is recorded with an N-value ($N>3$, $M<N$), is provided. A reproduction signal level of a cell recorded with the N-value, which follows the cell recorded with the M-value, is corrected based on a difference between a cell center value of a reproduction signal sampled when a center of a light spot is moved to a center of the cell recorded with the M-value and a reference value obtained from learning information.

7 Claims, 17 Drawing Sheets

| TABLE | PRECEDING CELL | TARGET CELL | FOLLOWING CELL |
|---|---|---|---|
| 1 | 0 | 0 | 0 |
| 2 | 0 | 1 | 0 |
| 3 | 0 | 0 | 1 |
| 4 | 0 | 1 | 1 |
| ⋮ | ⋮ | ⋮ | ⋮ |
| 127 | 7 | 0 | 7 |
| 128 | 7 | 1 | 7 |

↑ N-VALUE MARK (N=8)    ↑ M-VALUE MARK (M=2)    ↑ N-VALUE MARK (N=8)

| TABLE | PRECEDING CELL | TARGET CELL |
|---|---|---|
| 1 | 0 | 0 |
| 2 | 0 | 1 |
| 3 | 1 | 0 |
| 4 | 1 | 1 |

M-VALUE MARK (M=2)   M-VALUE MARK (M=2)

| TABLE | PRECEDING CELL | TARGET CELL | FOLLOWING CELL |
|---|---|---|---|
| 1 | 0 | 0 | 0 |
| 2 | 0 | 1 | 0 |
| 3 | 0 | 0 | 1 |
| 4 | 0 | 1 | 1 |
| 5 | 1 | 0 | 0 |
| 6 | 1 | 1 | 0 |
| 7 | 1 | 0 | 1 |
| 8 | 1 | 1 | 1 |

M-VALUE MARK (M=2)    M-VALUE MARK (M=2)    M-VALUE MARK (M=2)

FIG. 14A

| TABLE | PRECEDING CELL | TARGET CELL | FOLLOWING CELL |
|---|---|---|---|
| 1 | 0 | 0 | 0 |
| 2 | 0 | 1 | 0 |
| 3 | 0 | 2 | 0 |
| 4 | 0 | 3 | 0 |
| ⋮ | | ⋮ | |
| 511 | 7 | 6 | 7 |
| 512 | 7 | 7 | 7 |

FIG. 14B

| TABLE | PRECEDING CELL | TARGET CELL |
|---|---|---|
| 1 | 0 | 0 |
| 2 | 0 | 1 |
| 3 | 0 | 2 |
| 4 | 0 | 3 |
| ⋮ | | ⋮ |
| 63 | 7 | 6 |
| 64 | 7 | 7 |

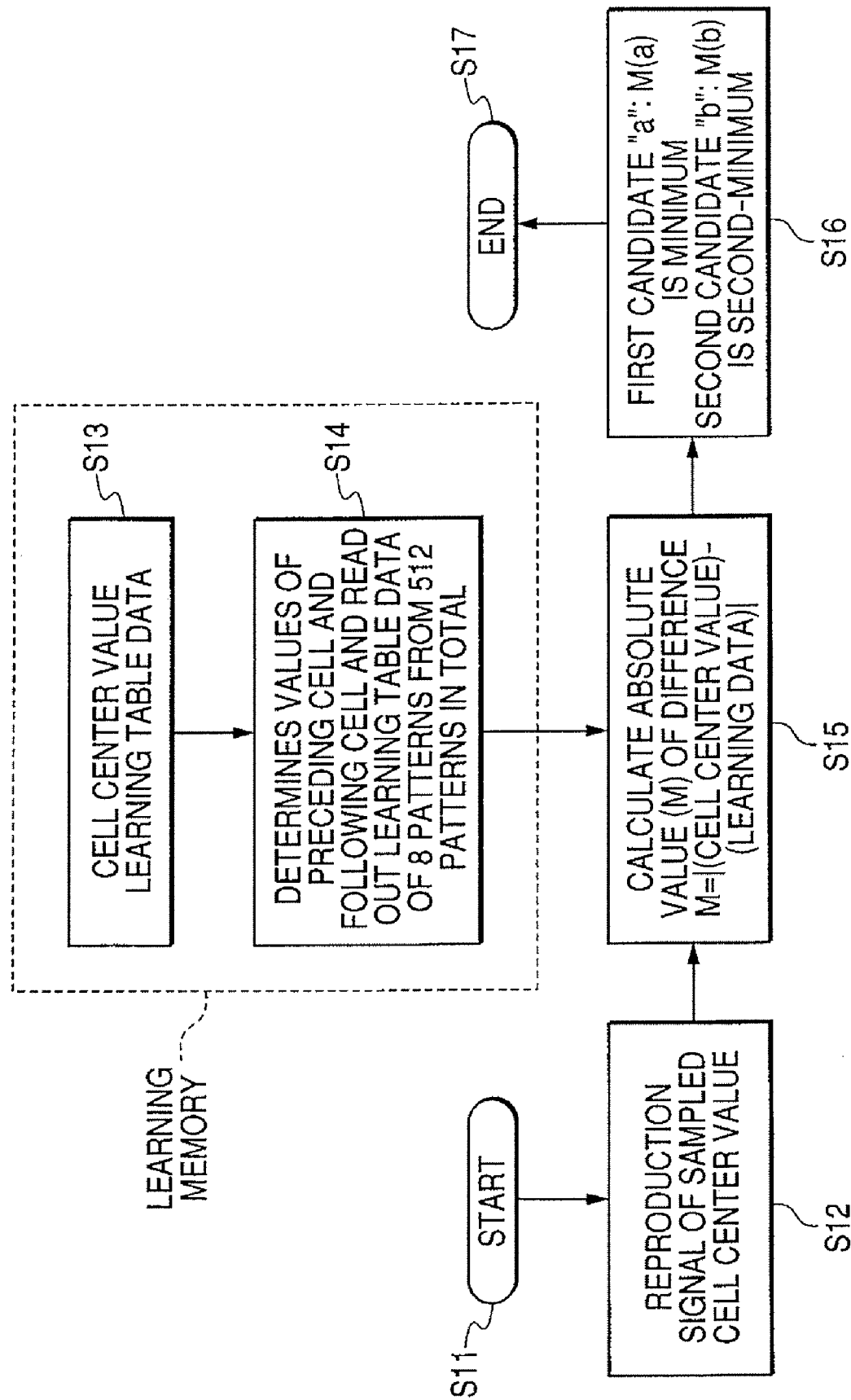

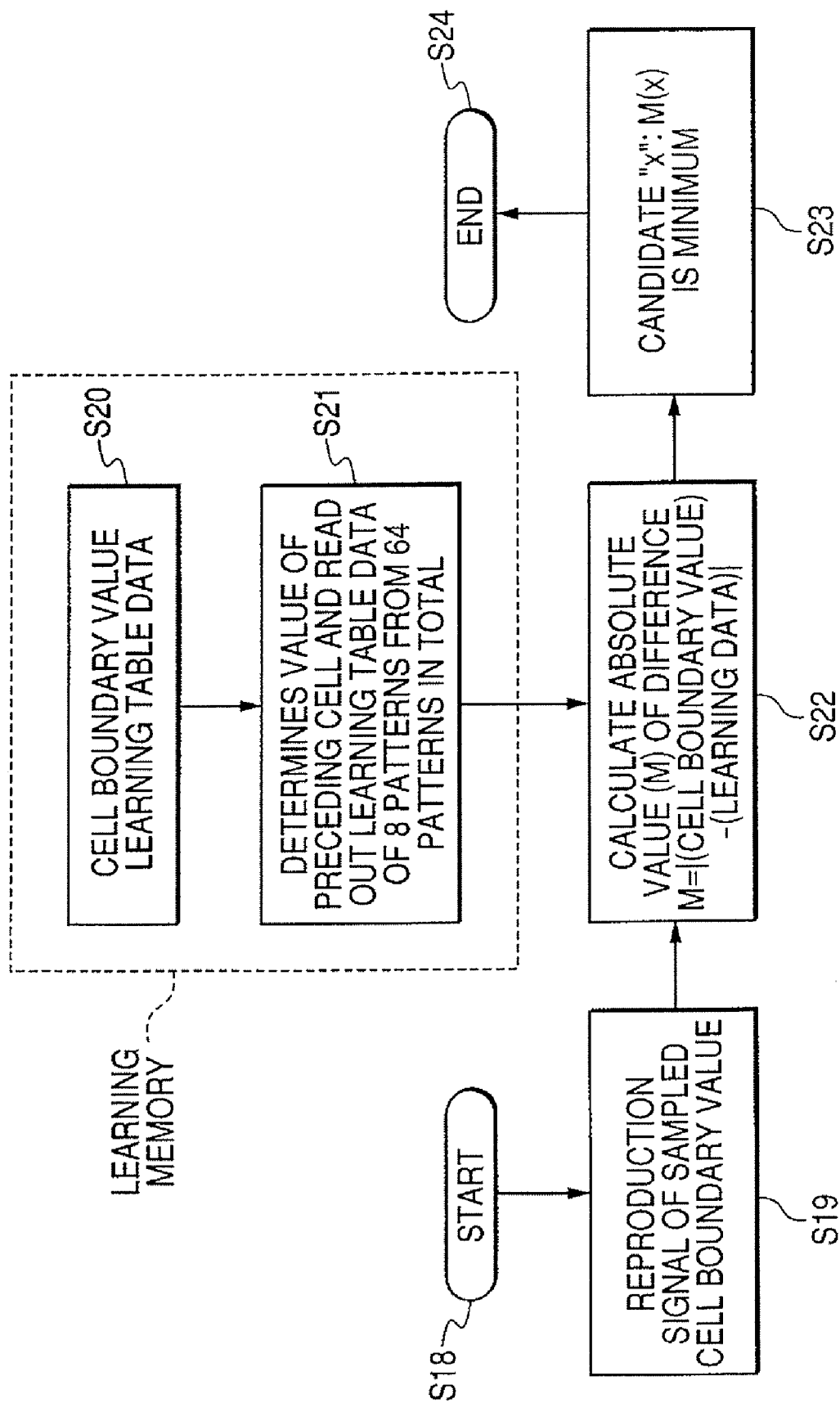

METHOD AND APPARATUS FOR REPRODUCING OPTICAL INFORMATION

BACKGROUND OF THE INVENTION

1. Field of the Invention

The present invention relates to an optical information reproducing method of reproducing multi-level information recorded on an information recording medium, such as an optical disk, and an apparatus for the method, and more particularly, to a method of efficiently performing level correction and automatic gain control (AGC) on a reproduction signal with high precision, and an apparatus for the method.

2. Description of the Related Art

Up to now, binary digital data is recorded on a spiral or concentric track of an optical disk. As recording methods, there are recording methods based on concave and convex pits formed by embossing, or the like (for a ROM disk), holes formed in an inorganic or organic recording film (for a write-once disk), a crystal state difference (for a phase change disk), a magnetization direction difference (for a magneto-optical disk), and the like.

When the recorded data is to be reproduced, a laser beam is emitted to the track to detect an intensity difference between reflected light beams, a polarization direction difference caused by a magnetic Kerr effect, and the like, thereby obtaining a reproduction RF signal. Then, binary data is detected based on the obtained reproduction RF signal.

In recent years, research and development for increasing a recording density of the optical disk are under way. A technique for more efficiently performing multi-level recording and reproduction using light spots having a same size has been proposed as an information recording and reproduction technique using a very small light spot.

For example, the inventors of the present invention proposed a method based on a multi-level recording and reproducing technique in Japanese Patent Application Laid-Open No. H05-128530. That is, according to the method, multi-level information is recorded on an information track of an optical information recording medium based on a combination of a width of an information pit in a track direction and an amount of shift of the information pit in the track direction relative to a reproduction light spot. In Japanese Patent Application Laid-Open No. H05-128530, there is also proposed a method of reproducing multi-level information based on a correlation between a detection signal obtained by learning in advance and a detection signal obtained from a light spot when the recorded multi-level information is to be reproduced from the information pit.

Further, a recording method of recording multi-level information (cipher method) based on the amount of shift of the information pit in the track direction has been proposed.

Here, a reproducing method in a case of eight-level recording in which the width of the information pit in the track direction is changed stepwise will be described. First, when information is to be recorded on the information recording medium, an eight-level information pit is formed on each cell after the information is converted from binary data into one of eight levels.

In the case of the eight-level recording, each cell corresponds to binary data of three bits. For example, as shown in FIG. 20, with respect to information of three bits, (0, 0, 0) corresponds to a level 0, (0, 0, 1) corresponds to a level 1, (0, 1, 0) corresponds to a level 2, and (0, 1, 1) corresponds to a level 3. In addition, (1, 0, 0) corresponds to a level 4, (1, 0, 1) corresponds to a level 5, (1, 1, 0) corresponds to a level 6, and (1, 1, 1) corresponds to a level 7.

For example, as shown in FIG. 20, in order to select one of the eight-level information pits, a width of a cell in the track direction is divided into sixteen. Assume that the level 0 indicates that no information pit for recording is formed, the level 1 indicates $2/16$ of the width of the cell, and the level 2 indicates $4/16$ of the width of the cell. In addition, assume that the level 3 indicates $6/16$ of the width of the cell, the level 4 indicates $8/16$ of the width of the cell, the level 5 indicates $10/16$ of the width of the cell, the level 6 indicates $12/16$ of the width of the cell, and the level 7 indicates $14/16$ of the width of the cell.

The selected information pit for recording is formed at random. A reproduction signal corresponding to the amount of light which is reflected on the multi-level information pit and received by a photodetector is sampled at a timing when a center of a light spot moves to a center of the width of the cell in the track direction. As a result, as shown in FIG. 21, amplitude distributions of reproduction signals corresponding to respective levels are obtained.

In FIG. 21, when the level 0, in which no information pit for writing is formed, is repeated, the amplitude of the reproduction signal is normalized as "1". In addition, when the information pit for recording, which corresponds to the level 7, is repeated, the amplitude of the reproduction signal is normalized as "0".

A value of the reproduction signal corresponding to each of the levels has a width because of an influence of the information pits formed before and after a target information pit (inter-symbol interference). As is apparent from FIG. 21, when the amplitude distributions of the reproduction signals corresponding to adjacent levels overlap with each other, the levels cannot be separately detected based on a fixed threshold value.

In order to solve this problem, the following method is described in a report presented in an ISOM 2003 meeting (see ISOM 2003 meeting "Write-once Disks for Multi-Level Optical Recording", Technical Digest Fr-Po-04). That is, according to the described method, reproducing signals are read from a series of pits in which a value of a target information pit and values of information pits before and after the target information pit are known in advance and then stored (learning). A value of the reproduction signal from an actual information pit is compared with the stored values (correlating) to separately detect the levels.

The above-mentioned methods are examples of the conventional multi-level recording and reproduction. In any of the methods, because of various factors, such as a reflectance difference between various optical disks in an optical disk and a reproduction frequency characteristic difference between an inner circumference side and an outer circumference side in a single optical disk, a variation in level or amplitude of the reproduction signal occurs. In addition, there is an influence caused by a mechanical factor difference or an optical factor difference between optical disk drives. Therefore, it is necessary to eliminate those factors.

According to a method of suppressing the level variation or the amplitude variation in the case where multi-information is to be reproduced, in general, fixed pattern regions, each of which is located between adjacent data regions, are provided at predetermined intervals to perform the automatic gain control (AGC) or level correction.

FIG. 22 is a simple diagram showing a normal block structure of the regions. As shown in FIG. 22, the fixed pattern region and the data region of the multi-level information are alternately recorded on the optical disk. The fixed pattern region is composed of a bias mark, a gain mark, and a clock mark.

A function of each of the marks will be described. In a case of the bias mark, a minimum mark is recorded (or no mark is recorded) on a cell to detect a minimum signal level. A level of a reproduction signal from a data region is corrected based on the minimum signal level as a reference level.

In a case of the gain mark, a maximum mark is recorded on a cell to detect a maximum signal level. The AGC is performed on a reproduction signal from a data region based on the maximum signal level. In a case of the clock mark, a tone signal is recorded on a cell to perform zero cross detection. A phase deviation from a clock synchronized with multi-level data is detected based on the tone signal, thereby performing a PLL operation.

When clock marks are used, sampling timings of subsequent data regions can be made to coincide with one another. In some cases, the fixed pattern region further includes address information and waveform equalization adaptive information, which are omitted in FIG. 22.

When a density is to be further increased, a size of the cell relative to the light spot becomes increasingly smaller, so a new problem occurs in the case where the level correction and the AGC are performed. That is, an S/N ratio of the reproduction signal is reduced by the inter-symbol interference with adjacent cells, with a result that the reproduction signal is more easily influenced by the level variation or the amplitude variation, which is caused by not only a low frequency component, but also a noise having a frequency close to a reproduction signal frequency band.

Therefore, a reproduction error rate significantly increases. For example, in a case of multi-level information data whose reproduction signal frequency is 22 MHz, a low frequency component of 50 kHz or less can be removed by a high-pass filter, or the like. However, in a practical case, noises are generated by a wobble component of a substrate groove, a substrate noise, or the like, even in a frequency band of 1 MHz to 5 MHz. The noises cannot be easily separated from the reproduction signal component.

As a result, the reproduction signal level is influenced by the noises, so it is likely to generate an erroneous determination value. Those problems can be avoided by increasing the number of fixed pattern regions to increase frequencies of the level correction and the AGC. However, the number of data regions cannot be ensured by the increase in the number of fixed pattern regions. Therefore, there is a problem in that format efficiency reduces.

SUMMARY OF THE INVENTION

An object of the present invention is to provide an optical information reproducing method capable of determining multi-level information with high precision without a reduction in format efficiency and influences of not only a low frequency component, but also a noise having a frequency close to a reproduction signal frequency band, and an apparatus for the method.

The present invention has been made to attain the above-mentioned object. According to an aspect of the present invention, there is provided a method of reproducing multi-level information recorded by changing one of a width and an area of an information pit in a track direction and a phase of the information pit in virtual cells provided on a track of an optical information medium at predetermined intervals, including the steps of setting the optical information medium including a plurality of cells, each of which is recorded with an N-value ($N \geq 3$), and a cell recorded with an M-value ($M<N$) for each group including the plurality of cells, obtaining a reproduction signal when a center of a light spot is moved to a center of the cell recorded with the M-value, and correcting a reproduction signal level of the cell recorded with the N-value, which follows the cell recorded with the M-value, based on a difference between a cell center value and a reference value obtained from learning information.

According to the feature of a first method of the present invention, the cell recorded with the M-value for each group, including the plurality of cells, each of which is recorded with the N-value ($N \geq 3$, $M<N$), is provided. The reproduction signal level of the cell recorded with the N-value, which follows the cell recorded with the M-value, is corrected based on the difference between the cell center value of the reproduction signal sampled when the center of the light spot is moved to the center of the cell recorded with the M-value and the reference value obtained from the learning information.

According to the feature of a second method of the present invention, the cell recorded with the M-value for each group, including the plurality of cells, each of which is recorded with the N-value ($N \geq 3$, $M<N$), is provided. A peak of the reproduction signal sampled when the center of the light spot is moved to the center of the cell recorded with the M-value is detected to perform AGC on the reproduction signal.

According to the feature of a third method of the present invention, cells recorded with successive M-values for each group, including the plurality of cells, each of which is recorded with the N-value mark ($N \geq 3$, $M<N$), are provided. A reproduction signal level of a cell recorded with the N-value, which follows a cell recorded with the M-value is corrected based on a difference between a reproduction signal sampled when the center of the light spot is moved to an interface between the cell recorded with the M-value and a following cell recorded with the M-value and a reference value obtained from learning information.

Further features of the present invention will become apparent from the following description of exemplary embodiments with reference to the attached drawings.

BRIEF DESCRIPTION OF THE DRAWINGS

FIGS. 14A and 14B show learning tables used for multi-level data determination, in which FIG. 14A shows a cell center value learning table and FIG. 14B shows a cell boundary value learning table.

FIG. 15 is an explanatory diagram showing a method of determining a candidate value of a target cell based on the cell center value learning table of a cell center value determination section shown in FIG. 13.

FIG. 16 is an explanatory diagram showing a method of determining a candidate value of the target cell based on the cell boundary value learning table of a cell boundary value determination section shown in FIG. 13.

DESCRIPTION OF THE EMBODIMENTS

Figure 1:
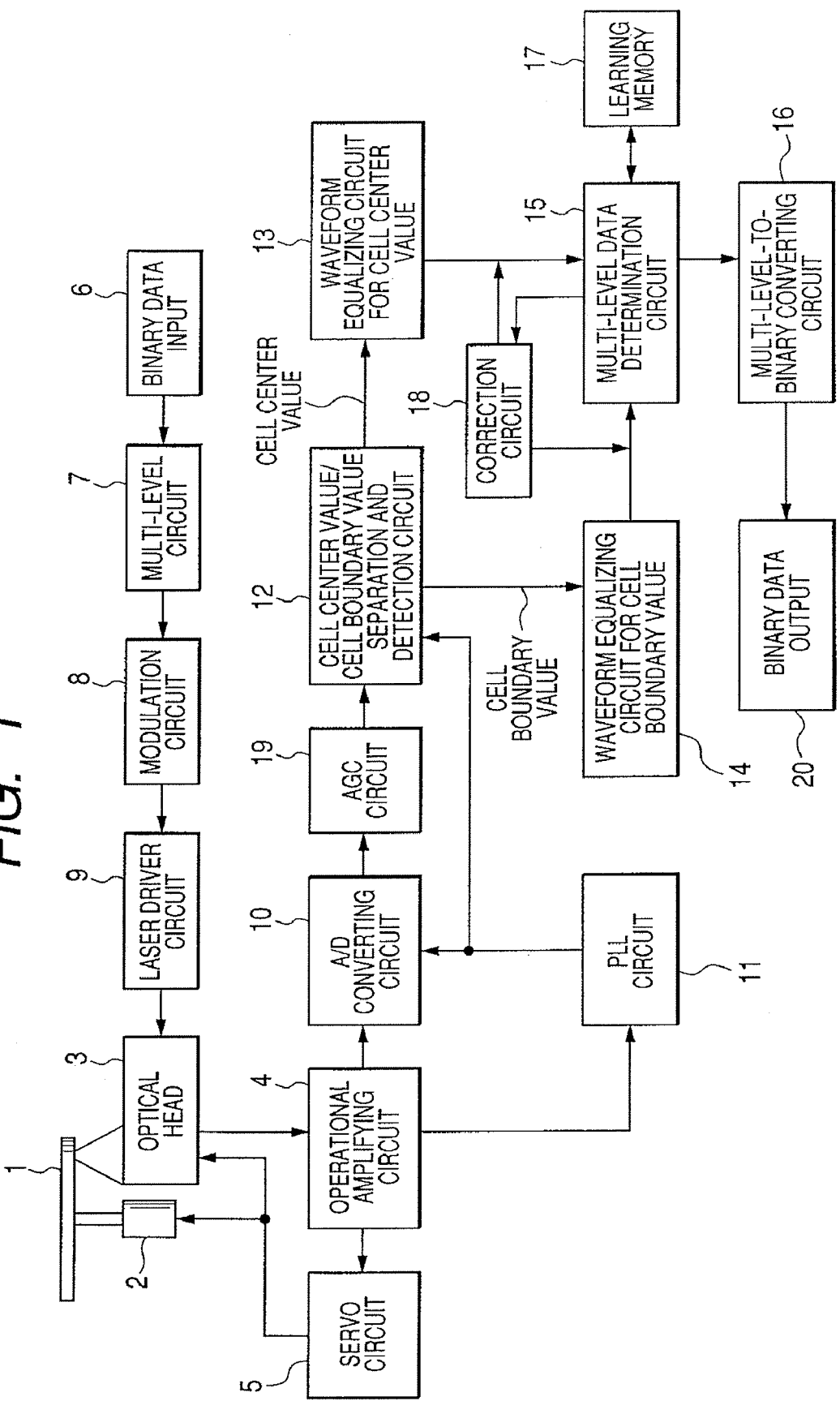
FIG. 1 is a block diagram showing an optical information recording and reproducing apparatus according to an embodiment of the present invention.

Hereinafter, a best mode for embodying the present invention will be described in detail with reference to the attached drawings. FIG. 1 is a block diagram showing a structure of an optical information recording and reproducing apparatus according to an embodiment of the present invention. In FIG. 1, reference numeral 1 denotes an optical disk, which is an information recording medium in which spiral or concentric tracks are formed, 2 denotes a spindle motor for rotating the optical disk 1, and 3 denotes an optical head for recording or reproducing multi-level information on or from the optical disk 1.

The optical head 3 includes a semiconductor laser, an objective lens, a photodetector, and the like, all of which are not shown. Laser light from the semiconductor laser is condensed by the objective lens to irradiate the light to the optical disk 1 as a very small light spot. Reflected light on the optical disk 1 is detected by the photodetector of the optical head 3. An operational amplifier 4 generates a focus error signal and a tracking error signal based on a signal from the photodetector in order to perform control so that the light spot is scanned along a predetermined track.

A servo circuit 5 performs focus and tracking control so as to scan the predetermined track with the light spot based on the signals from the operational amplifier 4. In addition, the servo circuit 5 controls the spindle motor 2 in order to rotate the optical disk 1 at a constant linear speed, a constant angular speed, or the like.

When the multi-level information is to be recorded on the optical disk 1, inputted binary data 6 is converted into multi-level data by a multi-level circuit 7. A signal corresponding to the multi-level data is outputted from a modulation circuit 8 to a laser driver circuit 9. Then, the semiconductor laser of the optical head 3 is driven by the laser driver circuit 9. Thus, a mark corresponding to the multi-level information is recorded on the track of the optical disk 1.

An example of the method of recording the multi-level information includes a method of adjusting a width or an area of an information pit in a track direction or a phase of the information pit in a virtual cell provided on the track of the optical disk 1.

On the other hand, when the multi-level information is to be reproduced, the optical disk 1 is irradiated with a light spot for reproduction by the optical head 3. Reflected light from the optical disk 1 is detected by the photodetector of the optical head 3. The operational amplifier 4 processes a detection signal from the photodetector to generate a reproduction signal. The reproduction signal is converted into a digital signal by an A/D converter 10.

After that, a gain of the reproduction signal is adjusted by an AGC circuit 19. Then, the reproduction signal is separated into a cell center value and a cell boundary value by a cell center value/cell boundary value separation and detection circuit 12. The processings (A/D conversion, gain control, and signal separation) are performed based on clocks generated by a PLL circuit 11. The cell center value separated by the cell center value/cell boundary value separation and detection circuit 12 is subjected to waveform equalization processing by a waveform equalizer 13 for a cell center value and the cell boundary value separated thereby is subjected to waveform equalization processing by a waveform equalizer 14 for a cell boundary value.

After that, a multi-level data determination circuit 15 reads a reference value of learning table data from a learning memory 17 and determines a multi-level based on the corresponding reference value and one of the cell center value and the cell boundary value. Here, a correction circuit 18 in the present invention calculates a correction value based on the determined multi-level and a reference value of the learning table data and adds the correction value to data obtained by waveform equalization processing, thereby performing the level correction and the AGC. The multi-level is converted into a binary level by a multi-level-to-binary converter 16 and is outputted as binary data 20 therefrom.

The above-mentioned operation corresponds to an outline of the method of recording and reproducing the multi-level information according to the present invention. Prior to the description of the correction circuit 18, a sampling position difference between the cell boundary value and the cell center value and respective characteristics of those will be described below with reference to FIGS. 2 and 3.

Figure 2:
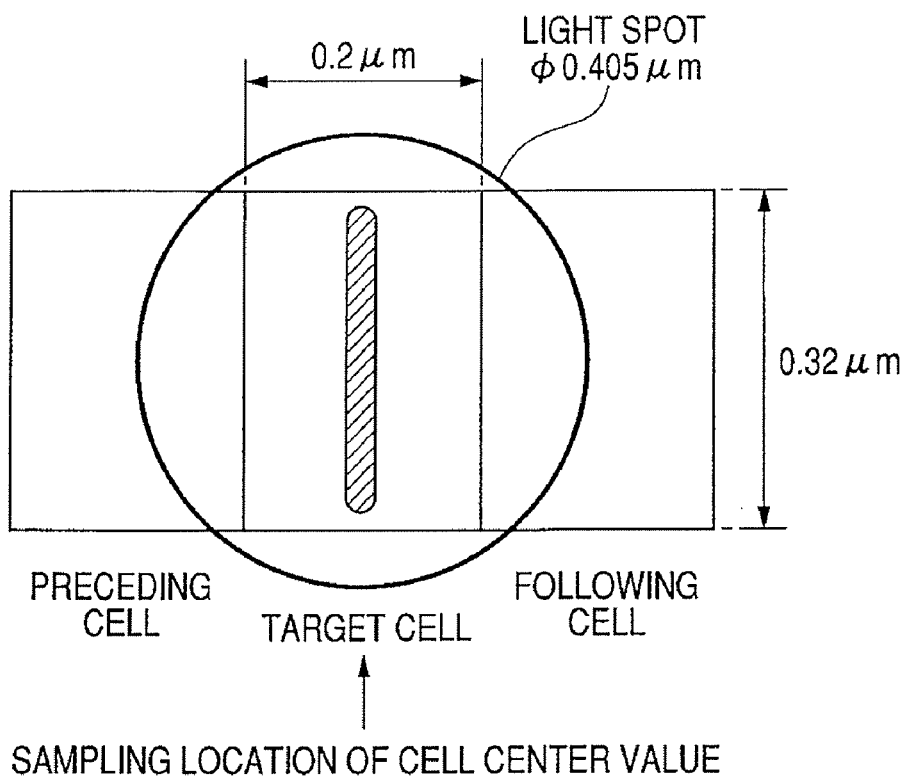
FIG. 2 is an explanatory diagram showing a positional relationship among preceding and following cells, and a light spot, in a case where a cell center value is sampled.

FIG. 2 is an explanatory diagram showing a positional relationship among preceding and following cells and a light spot in the case in which a cell center value is sampled. For example, a track pitch of the optical disk 1 is set to 0.32 μm and a light spot size is set to 0.405 µm (wavelength is 405 nm and numerical aperture of the objective lens is NA 0.85). A cell size is set to 0.2 µm.

According to a result obtained by experiment, in the case of the above-mentioned parameters, when a level of each of the preceding cell and the following cell is changed among "0" to "7", the cell center value of a target cell is not held to the same value, and, thus, has a width because of the influence of an inter-symbol interference. This is intuitively apparent from the fact that a skirt portion of the light spot located on the center cell overlaps on the right and left cells in FIG. 2. The influence of the inter-symbol interference on the cell center value increases with a reduction in cell size relative to the size of the light spot.

Figure 3:
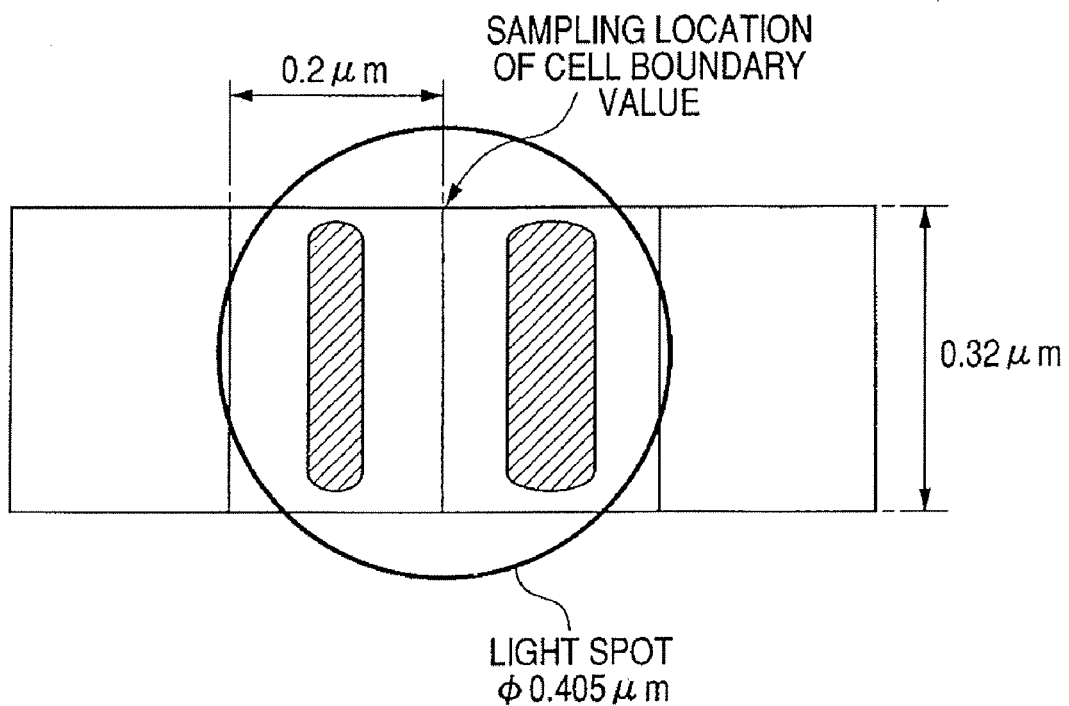
FIG. 3 is an explanatory diagram showing a positional relationship among the preceding and following cells, and the light spot, in a case where a cell boundary value is sampled.

FIG. 3 shows a positional relationship in the case where the light spot is moved to an interface between right and left cells in the case where a cell boundary value is sampled. The size of the light spot is 0.405 µm. In contrast to this, a total width of the two cells is 0.4 µm. Therefore, a large portion of the light spot is located on the right and left cells. In other words, the cell boundary value sampled at the interface between the right and left cells is not almost influenced by the outside of the cells. Therefore, the influence of the inter-symbol interference, which is caused by the outside of the right and left cells, becomes smaller.

The cell center value and the cell boundary value as described above are obtained by the cell center value/cell boundary value separation and detection circuit 12 by sampling at the clocks, which are generated by the PLL circuit 11 and synchronized with the multi-level data. The clock for sampling the cell center value and the clock for sampling the cell boundary value have the same frequency and different phases from each other by ½ period (assume that each cell corresponds to one period).

For example, a method proposed in Japanese Patent Application No. 2005-047198 (now published as Japanese Patent Application Laid-Open No. 2006-236441) by the inventors of the present invention can be used as a multi-level data determining method for the multi-level data determination circuit 15. This method will be described in detail later.

Figure 4:
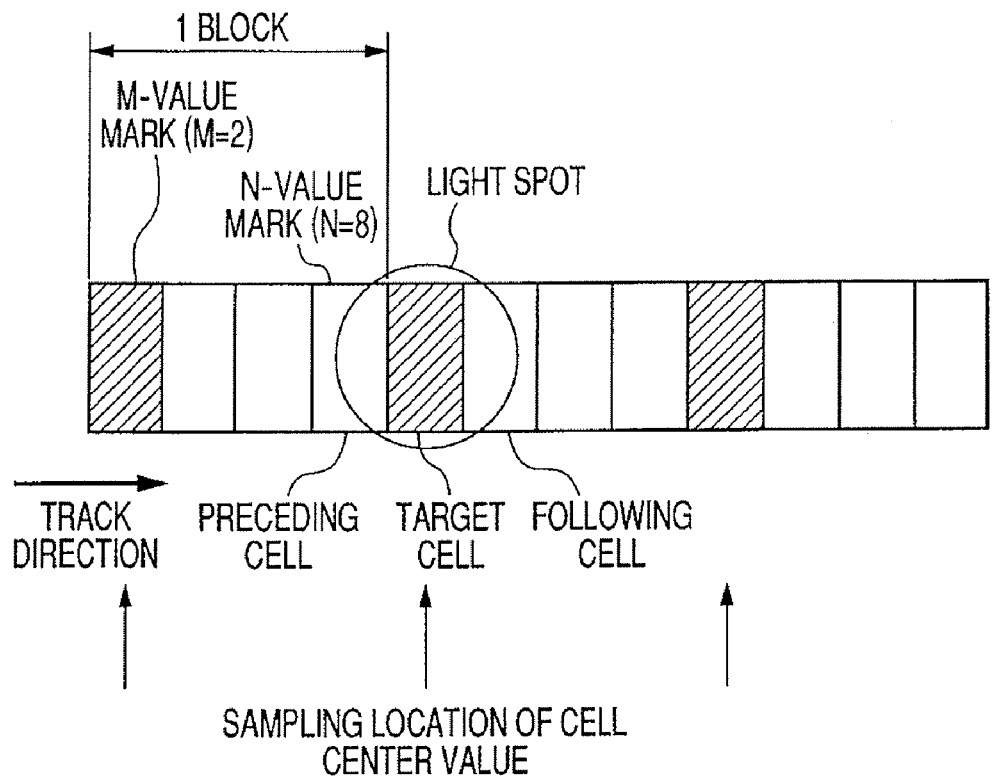
FIG. 4 shows a structure in which an M-value mark and N-value marks are recorded in a block and sampling locations of data used for level correction in a first method according to the present invention.

Next, a level correction method for the correction circuit 18 and an AGC method for the AGC circuit 19 in the present invention will be described in detail. FIG. 4 shows a structure in which an M-value mark and N-value marks are recorded on cells of each block and sampling locations of data used for the level correction. It is assumed that this corresponds to a first method.

Figure 5:
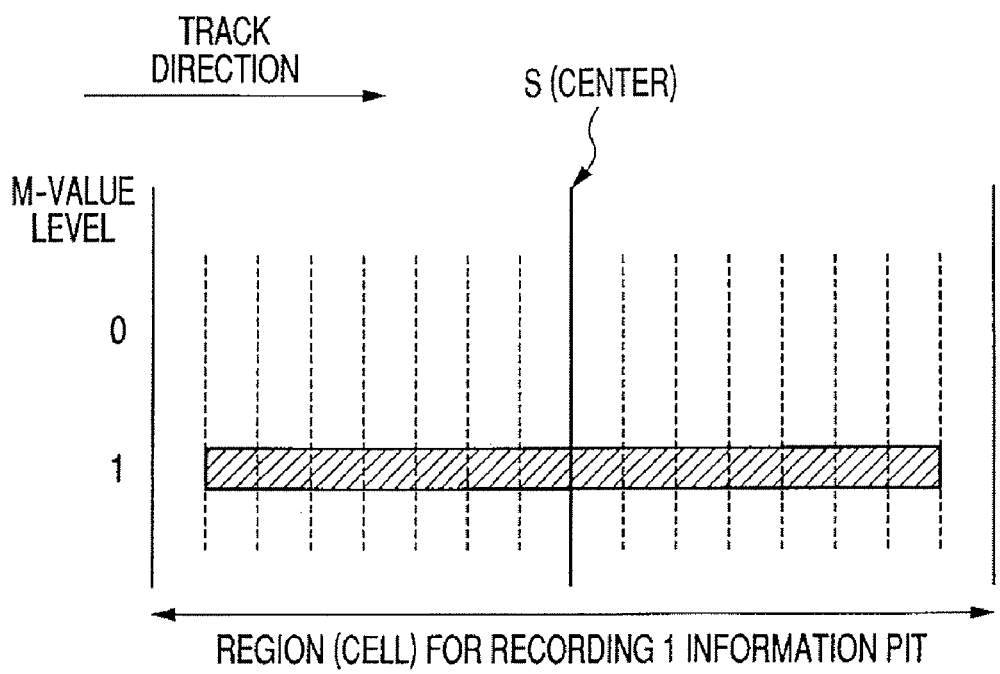
FIG. 5 is an explanatory diagram showing a width of an information pit in a track direction, which is changed according to a level, in a case where the M-value mark is recorded based on a binary level.

Here, M is set to 2 and N is set to 8. Assume that each block is composed of cells for one M-value mark and three N-value marks. The M-mark is recorded as a binary mark. Therefore, for example, as shown in FIG. 5, the mark of the level 0 is not recorded, and the mark of the level 1 is recorded in the track direction, so as to have a maximum width. This is identical to the case where the mark of the level 0 and the mark of the level 7 are recorded and reproduced in view of the eight-level recording. When the M-mark is recorded as the binary mark, there are two advantages.

A first advantage is that reproduction data of the M-value mark has substantially no error. A second advantage is as follows. Maximum and minimum levels of a cell center value of the M-value mark are equal to maximum and minimum levels of a reproduction signal. Therefore, the level difference is monitored every predetermined number of blocks, so a variation in amplitude of the reproduction signal can be measured. In the present invention, the first advantage that no error occurs, as described above, is used for the level correction performed by the correction circuit 18 and the second advantage that the variation in amplitude can be measured is used for the AGC circuit 19.

Figure 6:
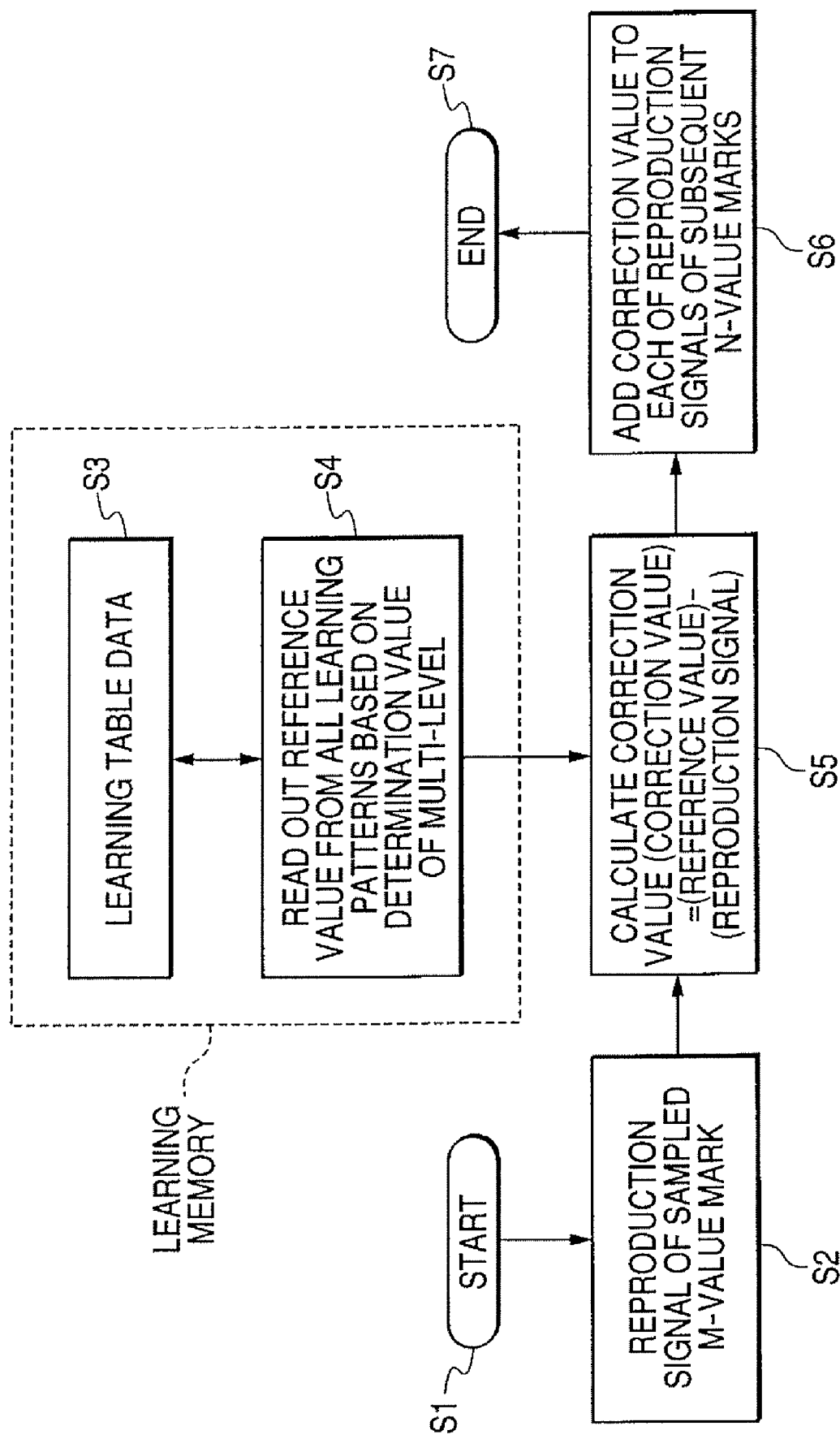
FIG. 6 shows an algorithm for performing the level correction on a reproduction signal in the present invention.

The level correction method for the correction circuit 18 will be described. FIG. 6 shows, for example, an algorithm for reproducing multi-level marks recorded in the structure shown in FIG. 4 and obtaining correction values based on determination values. First, in Step S1, a correction operation for each block starts. Next, in Step S2, a reproduction signal of a sampled M-value mark, a cell center value in this case, is inputted.

Figures 7, 8:
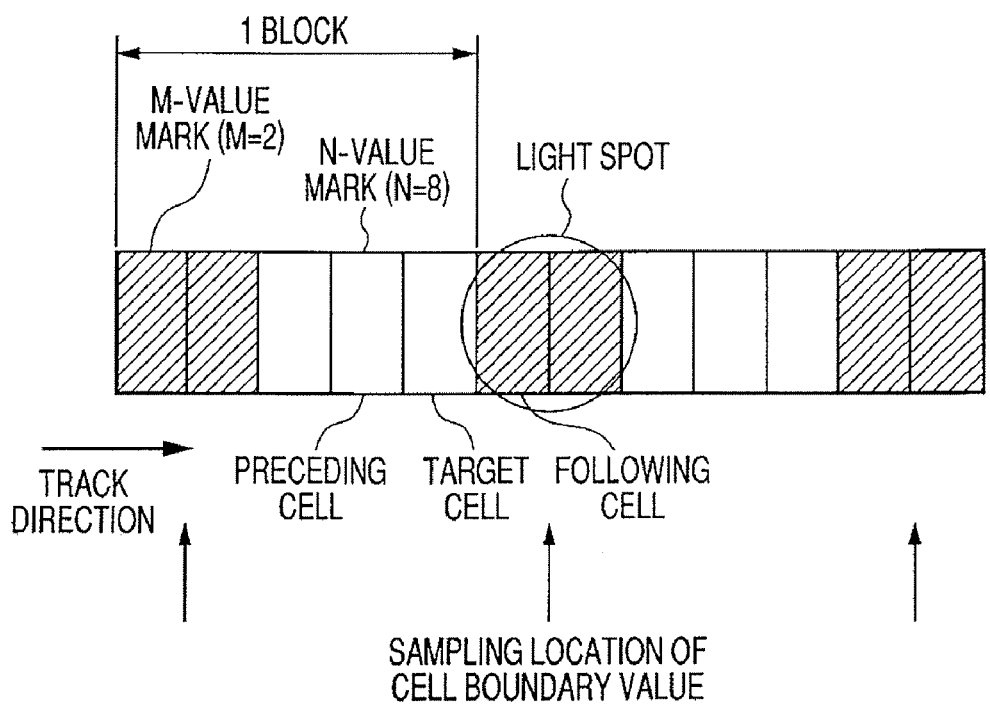
FIG. 7 shows a cell center value learning table (one cell of an M-value mark and two cells of an N-value mark, M=2) consulted for performing the level correction by the first method according to the present invention.
FIG. 8 shows a structure in which M is set to 2, N is set to 8, and cells of two M-value marks and three N-value marks are recorded in a block in a second method according to the present invention.

Then, in Step S3, learning table data of the learning memory 17 is accessed. In Step S4, a cell center value is obtained as a reference value from learning information of 128 (8×2×8) patterns in total, as shown in FIG. 7, based on multi-level determination values for three successive cells (preceding cell, target cell, and following cell), which are the target cell of a target M-value mark and the preceding and following cells of the N-value marks.

In order to prevent the inter-symbol interference between patterns, the information of the 128 patterns is recorded at predetermined pattern intervals in a head portion of a user data region of the optical disk 1. A controller (not shown) for controlling the respective portion of the apparatus detects a reproduction signal of a cell center value of each of the patterns before information recorded on the user data region is reproduced, and then causes the learning memory 17 to store sampling values as reference values.

Not the learning information as described above, but ideal sampling values obtained in advance by a simulation may be recorded in the head portion of the user data region. After that, in Step S5, the reproduction signal from the cell of the M-value mark and a corresponding reference value are subtracted from each other and a difference therebetween is used as a correction value. Then, in Step S6, the correction value is added to each of the reproduction signals from the cells of the three N-value marks, which are subsequent to the target cell. In Step S7, the operation is completed.

When the multi-level determination values for the three successive cells are erroneous values, each of the obtained correction values becomes a value with low reliability. However, the cell of the M-value mark has a binary level, so the determination value therefor takes substantially a correct value. As a result, the accuracy of the determination value for each of the preceding and following cells can be improved. This is because the determination value for the preceding and following cells is determined based on the determination value for the cell of the M-value mark during the determination algorithm process. Therefore, the accuracy of the multi-level determination values for the three successive cells is improved, with the result that the precision of the correction values can be improved.

Next, a second method will be described. In this case, M is set to 2 and N is set to 8. Assume that each block is composed of cells for two M-value marks and three N-value marks. Such a structure is shown in FIG. 8.

Figures 9, 10:
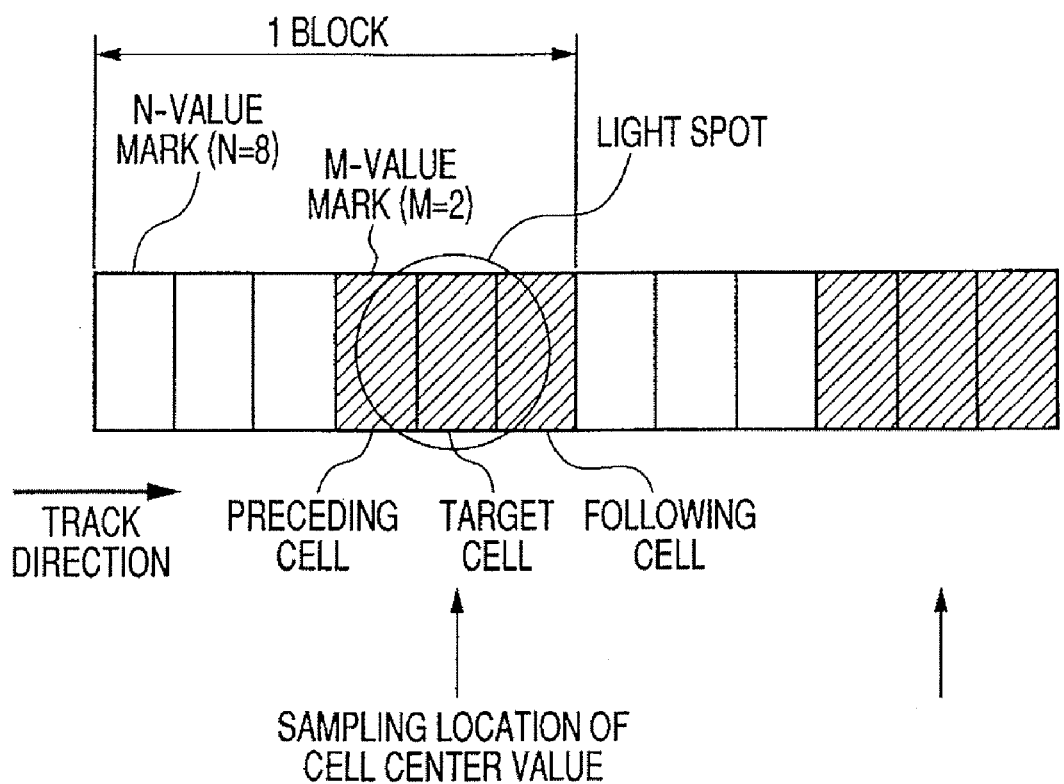
FIG. 9 shows a cell boundary value learning table (two cells of an M-value mark, M=2) consulted for performing level correction by the second method according to the present invention.
FIG. 10 shows a structure in which M is set to 2, N is set to 8, and cells of three M-value marks and three N-value marks are recorded in a block in a third method according to the present invention.

As in the case of the first method, in Step S1 shown in FIG. 6, the correction operation for each block starts. Next, in Step S2, a reproduction signal obtained by sampling at an interface between the two cells of the M-value marks, a cell boundary value in this case, is inputted. In Step S3, the learning table data is accessed. In Step S4, a cell boundary value is obtained as a reference value from learning information of 4 (2×2) patterns in total as shown in FIG. 9 based on multi-level determination values for the two successive cells (preceding cell and target cell), which have target M-value marks.

The information of the four patterns is similarly recorded in the head portion of the user data region of the optical disk 1. As in the above case, the controller (not shown) detects a reproduction signal of a cell boundary value of each of the patterns before the information recorded on the user data region is reproduced, and then causes the learning memory 17 to store sampling values as reference values.

After that, in Step S5, the reproduction signal of the cell boundary value and a corresponding reference value are subtracted from each other and a difference therebetween is used as a correction value. Then, in Step S6, the correction value is added to each of reproduction signals from the cells of the three N-value marks, which are subsequent to the target cell. In Step S7, the operation is completed.

Next, a third method will be described. In this case, M is set to 2 and N is set to 8. Assume that each block is composed of cells for three M-value marks and three N-value marks. Such a structure is shown in FIG. 10.

As in the case of the first method, in Step S1 shown in FIG. 6, the correction operation for each block starts. Then, in Step S2, a reproduction signal from the cell of the middle of the sampled three M-value marks, a cell center value in this case, is inputted.

Figures 11, 12:
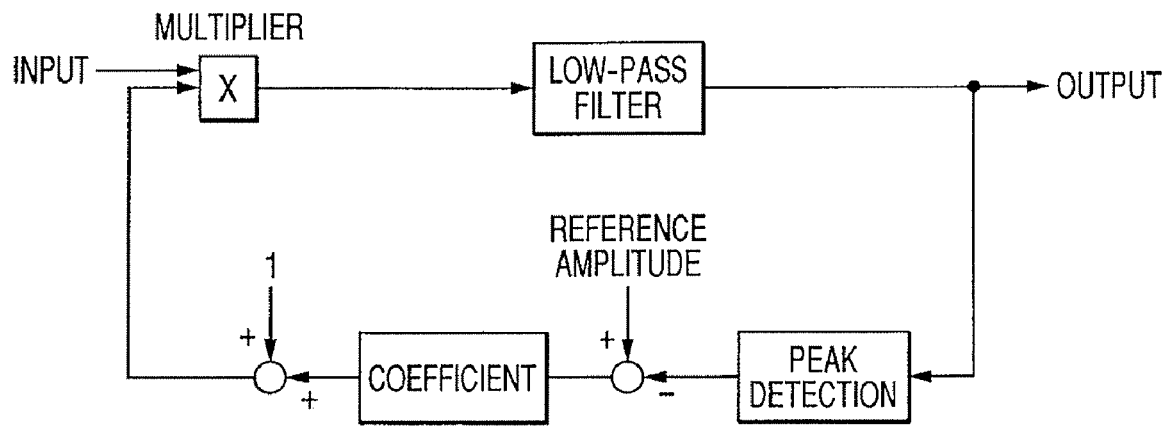
FIG. 11 shows a cell center value learning table (three cells of an M-value mark, M=2) consulted for performing level correction by the third method according to the present invention.
FIG. 12 is a schematic block diagram showing an AGC circuit according to the embodiment of the present invention.

After that, in Step S3, the learning table data is accessed. In Step S4, a cell center value is obtained as a reference value from learning information of 8 (2×2×2) patterns in total, as shown in FIG. 11, based on multi-level determination values for the three successive cells (preceding cell, target cell, and following cell), which have target M-value marks.

The information of the eight patterns is similarly recorded in the head portion of the user data region of the optical disk 1. As in the above case, the controller (not shown) detects a reproduction signal of a cell center value of each of the patterns before the information recorded on the user data region is reproduced, and then causes the learning memory 17 to store sampling values as reference values.

After that, in Step S5, the reproduction signal of the cell to be a center of the three M-value marks and a corresponding reference value are subtracted from each other and a difference therebetween is used as a correction value. Then, in Step S6, the correction value is added to each of reproduction signals from the cells of the three N-value marks, which are subsequent to the target cell. In Step S7, the operation is completed.

Next, a method for the AGC circuit 19 will be described. A fundamental structure for detecting the maximum and minimum levels of the reproduction signal to adjust the amplitude thereof is provided for the AGC in the present invention. The feature of the AGC is to use marks suitable to detect the maximum and minimum levels.

That is, the detection is performed using fixed marks recorded on a region different from an information data region in the conventional multi-level recording and reproduction. In contrast to this, the detection is performed using signal levels of recorded binary marks having a multi-level value lower than that of information data in the present invention. The reproduction signal of the N-value mark is a multi-step level, so the reproduction signal cannot be used as an input signal for the AGC.

FIG. 12 is a schematic block diagram showing an example of the AGC circuit 19. Peak detection is performed on a binary mark of an inputted reproduction signal at predetermined block intervals to detect the maximum and minimum levels. After that, a difference between the maximum and minimum levels and a reference amplitude value is multiplied by a coefficient to renew a gain value. When the difference between the maximum and minimum levels is equal to the reference amplitude value, the gain value to be renewed is zero. After that, one is added to the gain value and the inputted signal is multiplied by the gain value for the AGC. For example, an element structure, or the like, on a circuit, which determines an input and output characteristic of the AGC, is not particularly limited and thus, the description thereof is omitted here.

In the example shown in FIG. 4, the peak detection is performed on the cell center value of the production signal, which is sampled at the time when the center of the light spot is moved to the center of the cell subjected to M-value recording, thereby performing the AGC on the reproduction signal.

In the example shown in FIG. 8, the peak detection is performed on the cell center value of the production signal, which is sampled at the time when the center of the light spot is moved to the interface between the two successive cells subjected to M-value recording, thereby performing the AGC on the reproduction signal.

In the example shown in FIG. 10, the peak detection is performed on the cell center value of the production signal, which is sampled at the time when the center of the light spot is moved to the middle of the three successive cells subjected to M-value recording, thereby performing the AGC on the reproduction signal.

As described above, the AGC circuit in the present invention can be used in the same manner for any of the first method, the second method, and the third method, which have different structures with respect to the M-value mark and the N-value mark. The cell center value for the M-value mark is sampled to perform the peak detection. The above-mentioned method is the multi-level information reproducing method according to the present invention.

Figure 13:
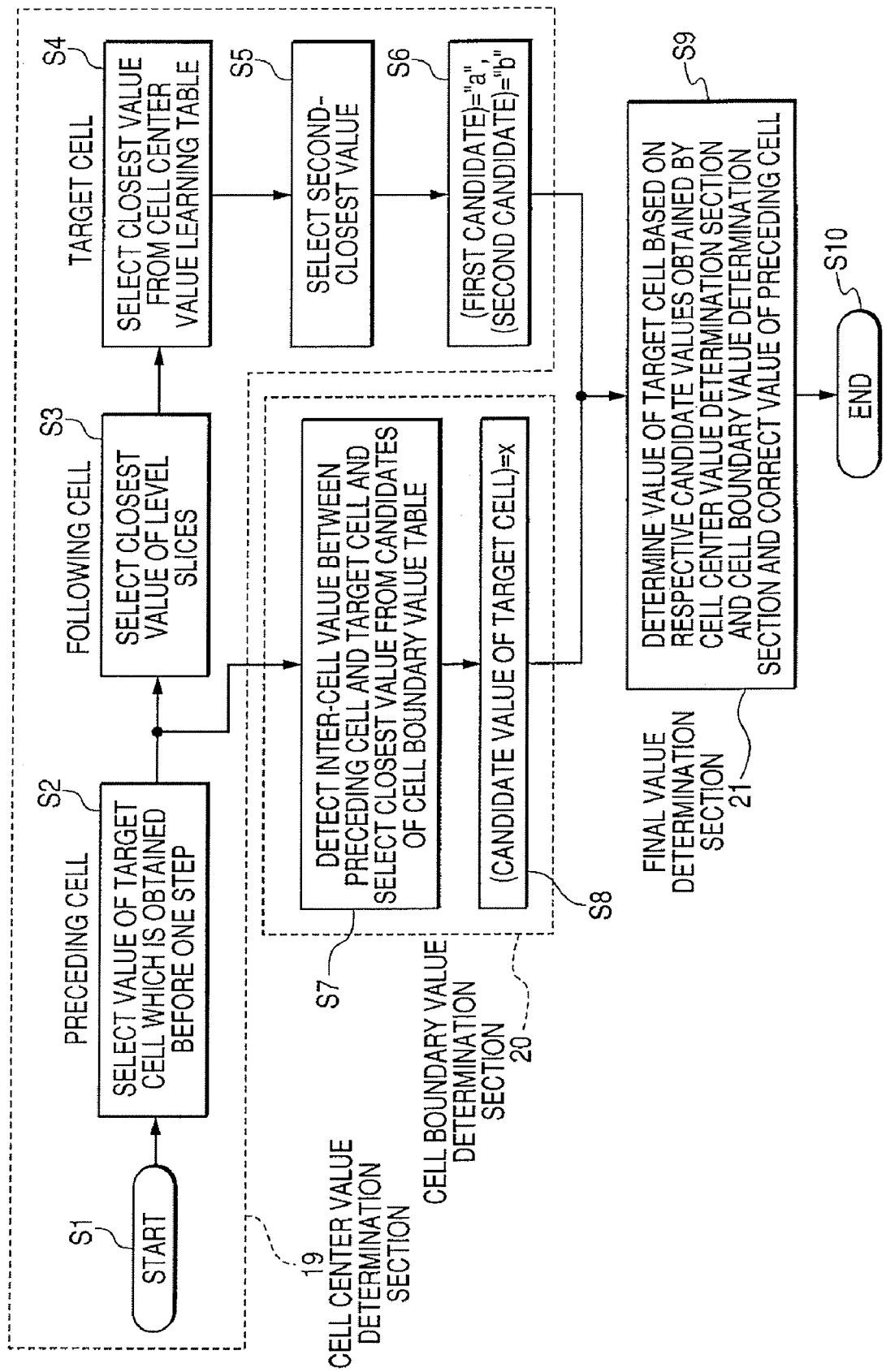
FIG. 13 is an explanatory diagram showing a multi-level data determining method for a multi-level data determination circuit.

Next, the multi-level data determination method for the multi-level data determination circuit 15 will be described with reference to FIGS. 13 to 19. This is proposed in Japanese Patent Application No. 2005-047198 as described above. In this embodiment, multi-level data corresponding to eight values of 0 to 7 are reproduced. FIG. 13 is an explanatory diagram showing the multi-level data determination method for the multi-level data determination circuit 15. The multi-level data determination circuit 15 mainly includes a cell center value determination section 19, a cell boundary value determination section 20, and a final value determination section 21.

First, the cell center value determination section 19 will be described. The cell center value determination section 19 determines the cell center value based on the three successive cells (preceding cell, target cell, and following cell) as described with reference to FIG. 2. Upon receiving the reproduction signal of the cell center value, the multi-level data determination circuit 15 starts the operation in Step S1.

Next, a value of the preceding cell is determined in Step S2 (here, a value of the target cell, which is obtained in the immediately preceding step, is selected). For example, when the value of the target cell which is determined in the immediately preceding step is "7", "7" is selected as the value of the preceding cell (here, the "selection" means that not final determination, but a provisional determination). Alternatively, a method of performing level slicing on the reproduction signal of the cell center value (value sampled at a time when the light spot is moved to the center of the preceding cell) at a plurality of threshold values corresponding to the respective levels to determine the value of the preceding cell may be used as the method of selecting the value of the preceding cell.

Then, in Step S3, a value of the following cell is selected by performing level slicing on the reproduction signal of the cell center value (value sampled at a time when the light spot is moved to the center of the following cell). (In the level slicing, a closest value is selected.) For example, "7" is selected as the value of the following cell. The value of the preceding cell and the value of the following cell, of the three successive cells, are selected by the above-mentioned operation.

Then, in Step S4, a value of the target cell, which is closest to the reproduction signal of the cell center value is selected from a cell center value learning table (FIG. 14A) based on the value of the preceding cell and the value of the following cell. In Step S5, a second-closest value is selected. In Step S6, the values selected in Steps S4 and S5 are determined as a first candidate "a" and a second candidate "b".

Steps S4 to S6 performed by the cell center value determination section 19 will be described in more detail with reference to FIGS. 14A, 14B, and 15. FIGS. 14A and 14B show learning tables used for the multi-level data determination. FIG. 14A shows the cell center value learning table. This table has 512 (8×8×8) patterns in total, which correspond to all possible combinations of the preceding cell, the target cell, and the following cell. The information of the 512 patterns is recorded in the head portion of the user data region of the optical disk 1. Before the information recorded on the user data region is reproduced, the reproduction signal of the cell center value of the target cell in each of the patterns is detected, and then the sampling values are stored as the reference values in the learning memory 17.

Next, a method of determining the candidate value of the target cell based on the cell center value learning table in Steps S4 to S6 performed by the cell center value determination section 19, as shown in FIG. 13, will be described with reference to FIG. 15. First, in Step S11, the operation starts. In Step S12, the reproduction signal of the sampled cell center value is inputted to the cell center value determination section. In Step S13, the learning memory 17 is accessed. In Step S14, reference values obtained in the cell center value learning table shown in FIG. 14A are sequentially read out from the learning memory 17 every time the cell center value is inputted.

At this time, "7" is selected as each of the value of the preceding cell and the value of the following cell (see the description of FIG. 13), so patterns to be read out from the table are limited from the 512 patterns to eight patterns, that is, combinations of (7, 0, 7) to (7, 7, 7). Then, in Step S15, an absolute value of a difference between the cell center value and each of the reference values of the eight patterns is calculated and obtained as an M-value. In Step S16, eight M-values are compared with one another and an M-value obtained when the value of the target cell is "a" (expressed by M(a)) is assumed to be minimum. Therefore, "a" is determined as the first candidate in the cell center value determination section 19.

In addition, an M-value obtained when the value of the target cell is "b" (expressed by M(b)) is assumed to be a second-minimum. Therefore, "b" is determined as the second candidate in the cell center value determination section 19. After that, the operation proceeds to Step S17 and is completed. The above-mentioned description relates to the cell center value determination section 19.

The description returns to FIG. 13. A method of determining the value of the target cell in the cell boundary value determination section 20 will be described in detail with reference to FIGS. 14A, 14B and 16. As shown in FIG. 13, in Step S7, the cell boundary value determination section 20 selects a value of the target cell, which is closest to the reproduction signal of the cell boundary value from the cell boundary value learning table (FIG. 14B), based on the value of the preceding cell, which is determined in Step S2. In Step S8, the value selected in Step S7 is determined as a candidate value "x".

Steps S7 and S8 performed by the cell boundary value determination section 20 will be described in detail with reference to FIGS. 14A, 14B, and 15. FIG. 14B shows the cell boundary value learning table. This table has sixty-four (8×8) patterns in total, which correspond to all possible combinations of the preceding cell and the target cell. The information of the sixty-four patterns is recorded in the head portion of the user data region of the optical disk 1 in the same manner. Before the information recorded on the user data region is reproduced, the reproduction signal of the cell boundary value of the target cell in each of the patterns is detected, and then the sampling values are stored as the reference values in the learning memory 17.

Next, a method of determining the candidate value of the target cell based on the cell boundary value learning table in Steps S7 and S8 performed by the cell boundary value determination section 20, as shown in FIG. 13, will be described with reference to FIG. 16. First, in Step S18, the operation starts. In Step S19, the reproduction signal of the sampled cell boundary value is inputted to the cell boundary value determination section 20. In Step S20, the learning memory 17 is accessed. In Step S21, reference values obtained in the cell boundary value learning table shown in FIG. 14B are sequentially read out from the learning memory 17 every time the cell boundary value is inputted.

At this time, "7" is selected as the value of the preceding cell (see the description of FIG. 13), so patterns to be read out from the table are limited from the sixty-four patterns to eight patterns, that is, combinations of (7, 0) to (7, 7). Then, in Step S22, an absolute value of a difference between the cell boundary value and each of the reference values of the eight patterns is calculated and obtained as an M-value. In Step S23, eight M-values are compared with one another and an M-value obtained when the value of the target cell is "x" (expressed by M(x)) is assumed to be minimum. Therefore, "x" is determined as the candidate value in the cell boundary value determination section 20. After that, the operation proceeds to Step S24 and is completed. The above-mentioned description relates to the cell boundary value determination section 20.

The description returns to FIG. 13 again. An algorithm for the final value determination section 21 for performing a final determination, based on the candidate values obtained in the cell center value determination section 19 and the cell boundary value determination section 20, will be described in detail with reference to FIGS. 17, 18, and 19.

Figure 17:
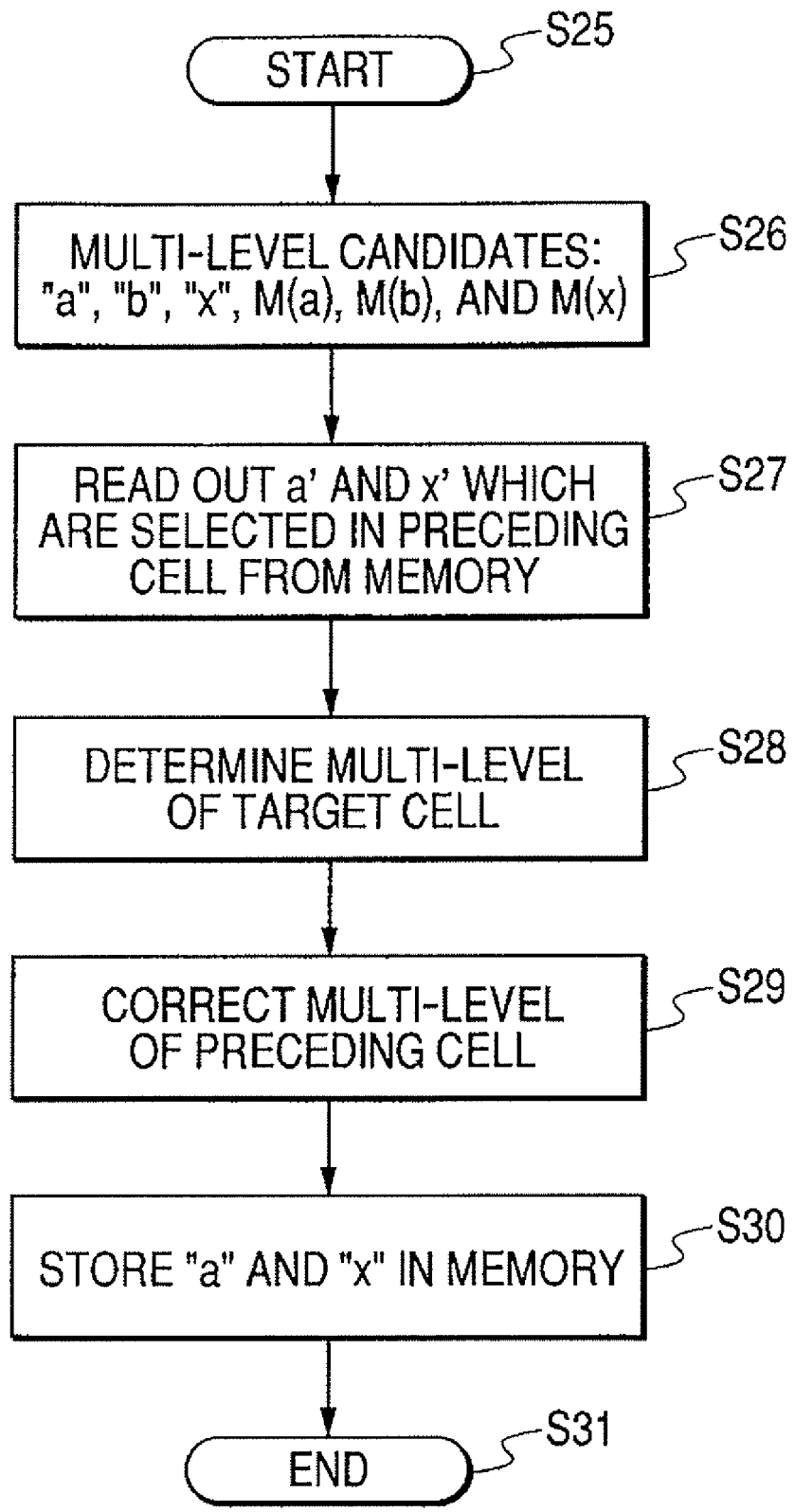
FIG. 17 is an explanatory diagram showing an algorithm for a final value determination section shown in FIG. 13.

FIG. 17 is a flowchart showing a processing operation of the final value determination section 21. First, in Step S25, the operation starts. In step S26, the multi-level candidates "a", "b", and "x" and the M-values M(a), M(b), and M(x) corresponding thereto are inputted. In Step S27, "a'" and "x'", which are candidate values selected in the preceding cell, are read out from the memory. The candidate values "a'" and "x'" correspond to "a" and "x" stored in the memory before the completion of a series of final value determination operations, which is performed in the immediately preceding step in Step S30. In Step S28, the multi-level of the target cell is finally determined based on the parameters. In Step S29, the multi-level of the preceding cell is corrected. In Step S30, "a" and "x" are stored in the memory. Then, the operation proceeds to Step S31 and is completed.

Figure 18:
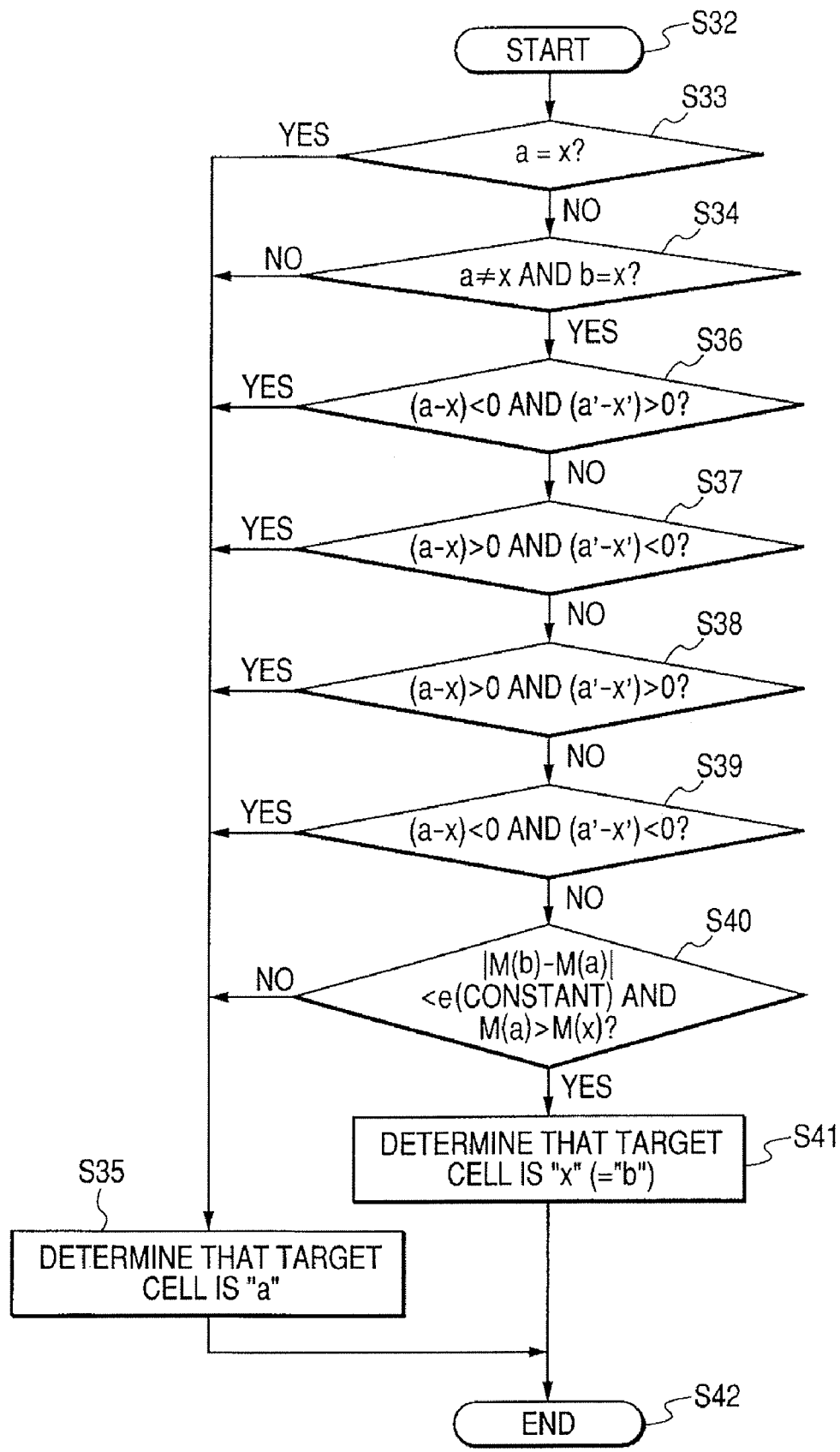
FIG. 18 is an explanatory diagram showing an algorithm for determining a multi-level of the target cell shown in FIG. 17.

Next, an algorithm of Step S28 for finally determining the multi-level of the target cell will be described in detail with reference to FIG. 18. In Step S32, the operation starts. In step S33, whether or not the case of "a=x" is established is checked. When "a=x", the operation proceeds to Step S35 because it is expected that an accuracy rate be considerably high. Therefore, the value of the target cell is determined to be "a". In Step S42, the operation is completed. On the other hand, when "a≠x", the operation proceeds to Step S34 and whether or not the case where "a≠x" and "b=x" is established is checked.

In this case, it is difficult to determine one of "a" and "x" as a correct value. Therefore, it is necessary to determine the correct value in view of other parameters. In the present invention, "a'" and "x'", which are the candidate values selected in the immediately preceding step in the preceding cell, and M(a), M(b), and M(x), each of which is the absolute value of the difference with the reference value of the learning table, are used as the parameters.

Next, a method of performing the determination in view of "a'" and "x'" in Steps S36 to S39 will be described. An object of this method is to examine a relationship between the candidate value of the preceding cell and the candidate value of the target cell, thereby further improving the accuracy of determination of the target cell. That is, a rule which is necessarily made between the candidate value of the preceding cell and the candidate value of the target cell when a result obtained by determination of the preceding cell is different from an actual correct value is used. First, the case where "x'" is erroneously determined as a final value of the preceding cell is examined.

For example, assume that the correct value of each of the preceding cell and the target cell is "3", the candidate value a' of the preceding cell is "3", and x' thereof is "2". Here, when "x'", which is "2" is erroneously selected as a final determination value, "a" and "x" which are the candidate values of the target cell become "3" and "4", respectively, at high possibility. This reason is as follows. As described above, when the level of the preceding cell is "X" (0≦X≦7: X is an integer), the level of the following cell is "Y" (0≦Y≦7: Y is an integer), and the cell boundary value is "Z" (0≦Z≦14: Z is an integer), a relationship of "X+Y=Z" (or Z−X=Y) is held (In this case, Z=6).

This is expressed by the following general expression:

(a−x)<0 and (a'−x')>0 Step S36 or (a−x)>0 and (a'−x')<0 Step S37.

When the condition in Step S36 or S37 is satisfied, "x" is erroneous at a high possibility. Therefore, "a" is finally determined for the target cell in Step S35. In Step S42, the operation is completed.

In contrast to this, the case where a' is erroneously determined as the final value of the preceding cell is examined. Assume that the correct value of each of the preceding cell and the target cell is "3", the candidate value a' of the preceding cell is "4", and x' thereof is "3". Here, when a' which is "4" is erroneously selected as the final determination value, "a" and "x", which are the candidate values of the target cell become "3" and "2", respectively, at high possibility.

This is expressed by the following general expression:

(a−x)>0 and (a'−x')>0 Step S38 or (a−x)<0 and (a'−x')<0 Step S39.

When the condition in Step S38 or S39 is satisfied, "x" is erroneous at high possibility. Therefore, "a" is finally determined for the target cell in Step S35. In Step S42, the operation is completed. The above-mentioned method is the method of performing the determination in view of "a'" and "x'".

When any condition in Steps S36 to S39 is not satisfied, the determination is performed using the second method in view of M(a), M(b), and M(x). That is, when the condition in Step S40 (|M(b)−M(a)|<e and M(a)>M(x)) is satisfied, "x (=b)" is finally determined for the target cell in Step S41. Here, reference symbol "e" denotes a constant. For example, the constant "e" is desirably set to ½ to ¼ of a level difference between the reproduction signals of the cell center values of the respective multi-levels.

In other words, when the condition of "|M(b)−M(a)|<e" is satisfied, it is very difficult to determine one of "a" and "b" based on the reproduction signal of the cell center value. In the ultimate case of "|M(b)−M(a)|=0", each of the possibility that the target cell has "a" and the possibility that the target cell has "b" is 50%. Therefore, when the condition of "M(a)>M(x)" is satisfied, it is determined that the target cell has "x (=b)" at a high possibility. In Step S42, the operation is completed.

Finally, the case where the conditions in Steps S33 and S34 are not satisfied (the case of a≠x and b≠x) is examined. In this case, "x" is erroneous at a high possibility. Therefore, the value of the target cell is determined to be "a" in Step S35 and the operation is completed in Step S42. This is because, it is apparent from a result obtained by simulation that an error at the time of reproduction in the case of multi-level recording is within approximately ±1 level ("a" or "b" is correct), and thus the possibility that "x" is correct is very low.

The description returns to FIG. 17. In Step S28, the multilevel of the target cell is finally determined. After that, in Step S29, the multi-level of the preceding cell is corrected.

Figure 19:
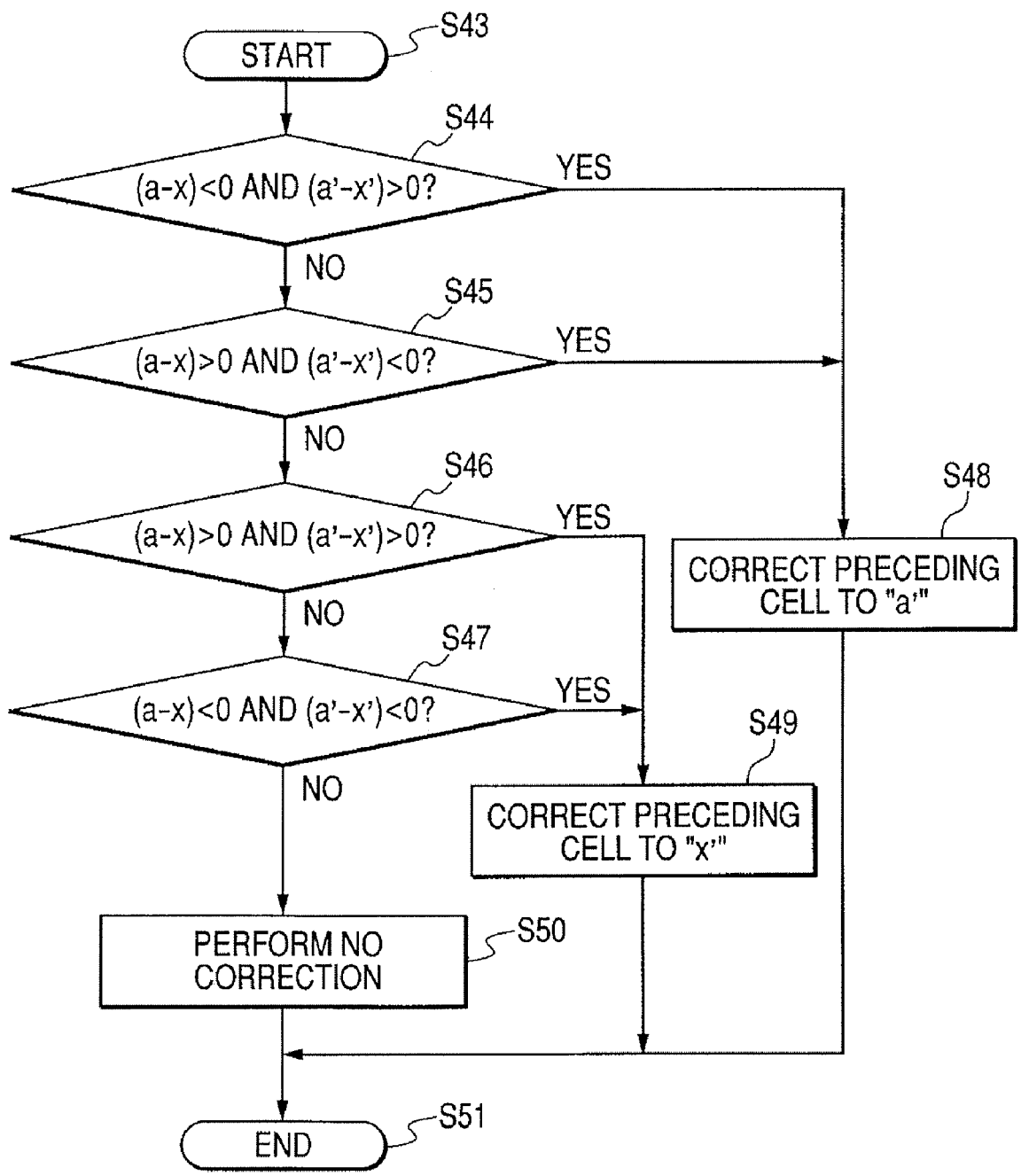
FIG. 19 is an explanatory diagram showing an algorithm for correcting a multi-level of a preceding cell shown in FIG. 17.
Figure 20:
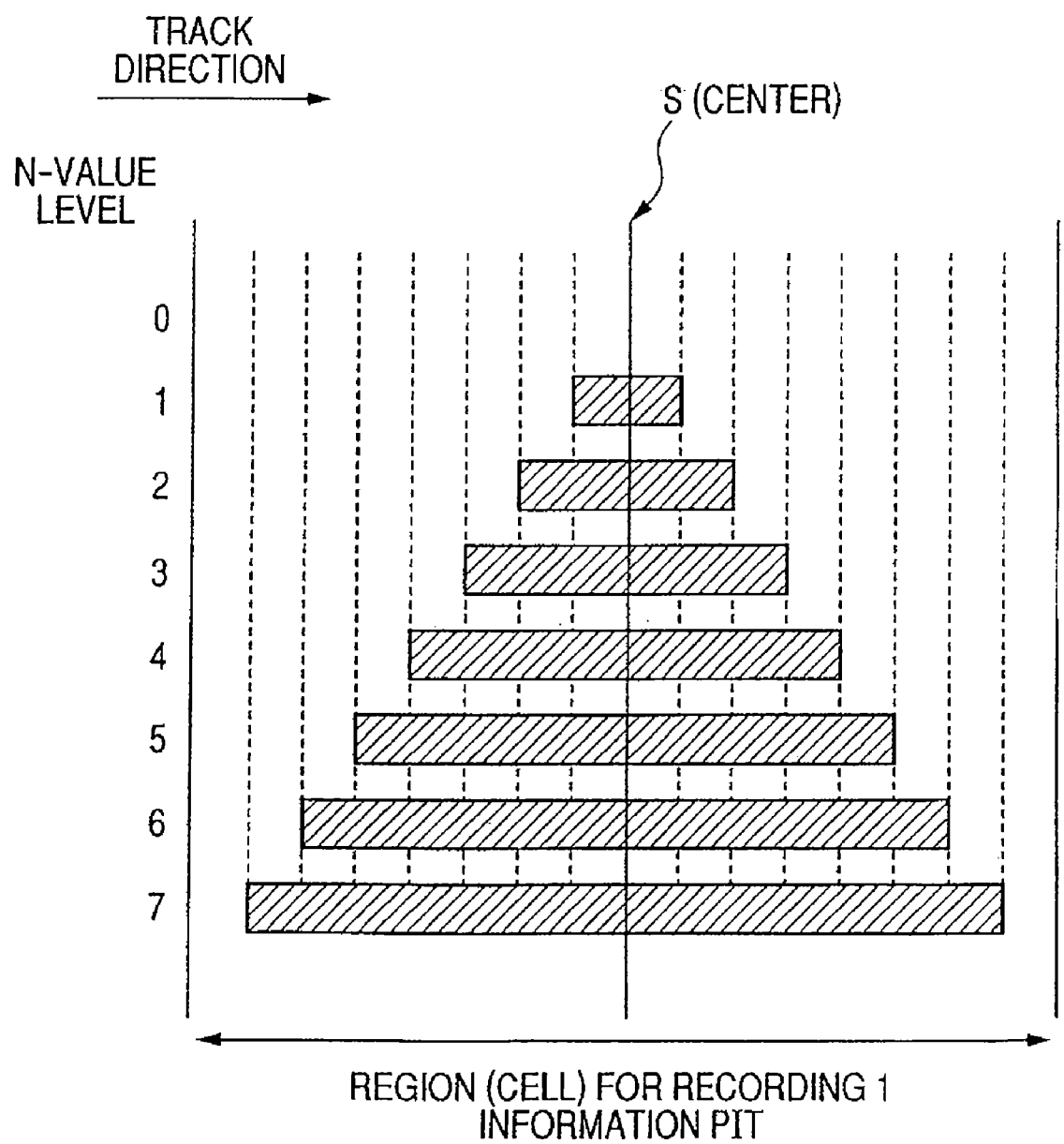
FIG. 20 is an explanatory diagram showing widths in a track direction and corresponding combinations of three bits based on different levels of multi-level information pits.
Figure 21:
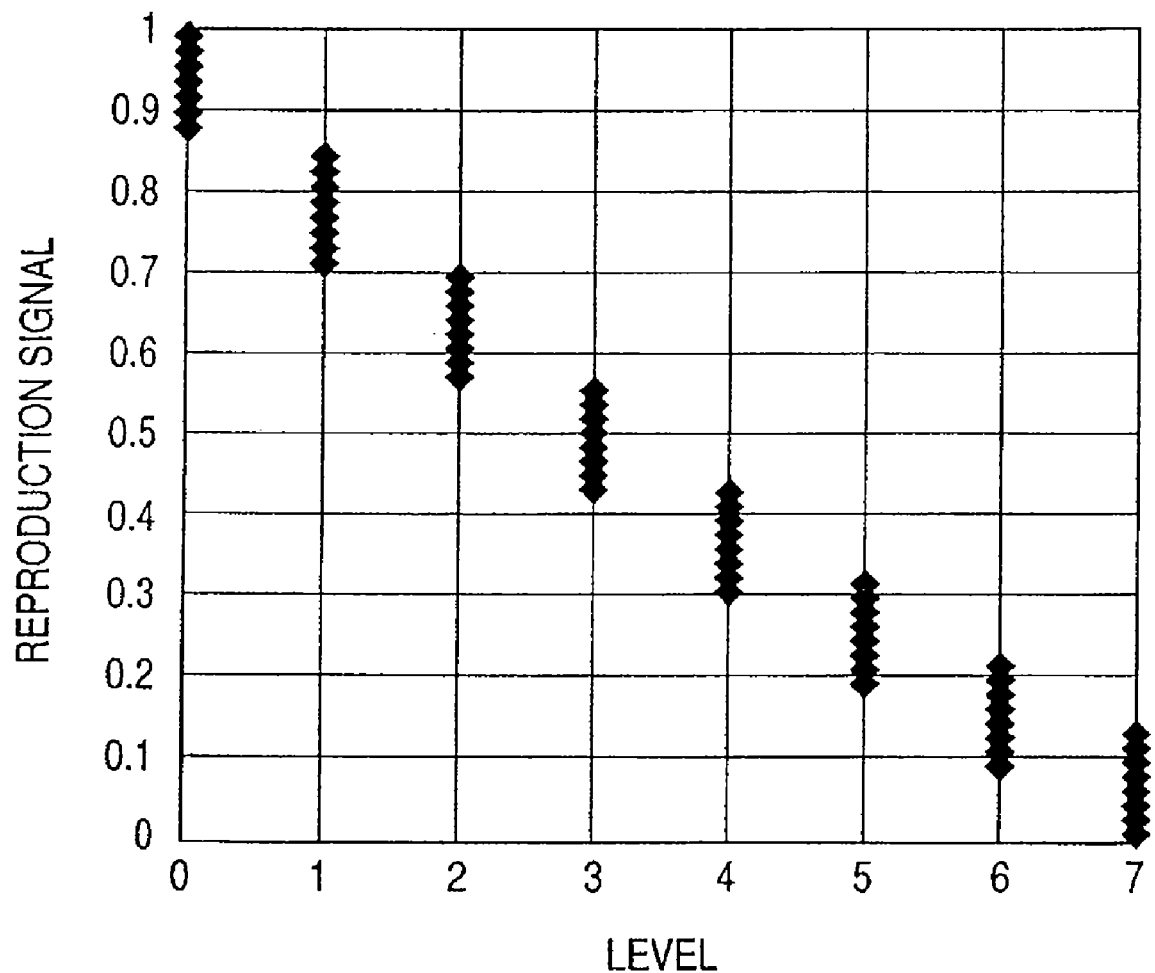
FIG. 21 is an explanatory diagram showing amplitude distributions of the cell center values.
Figure 22:
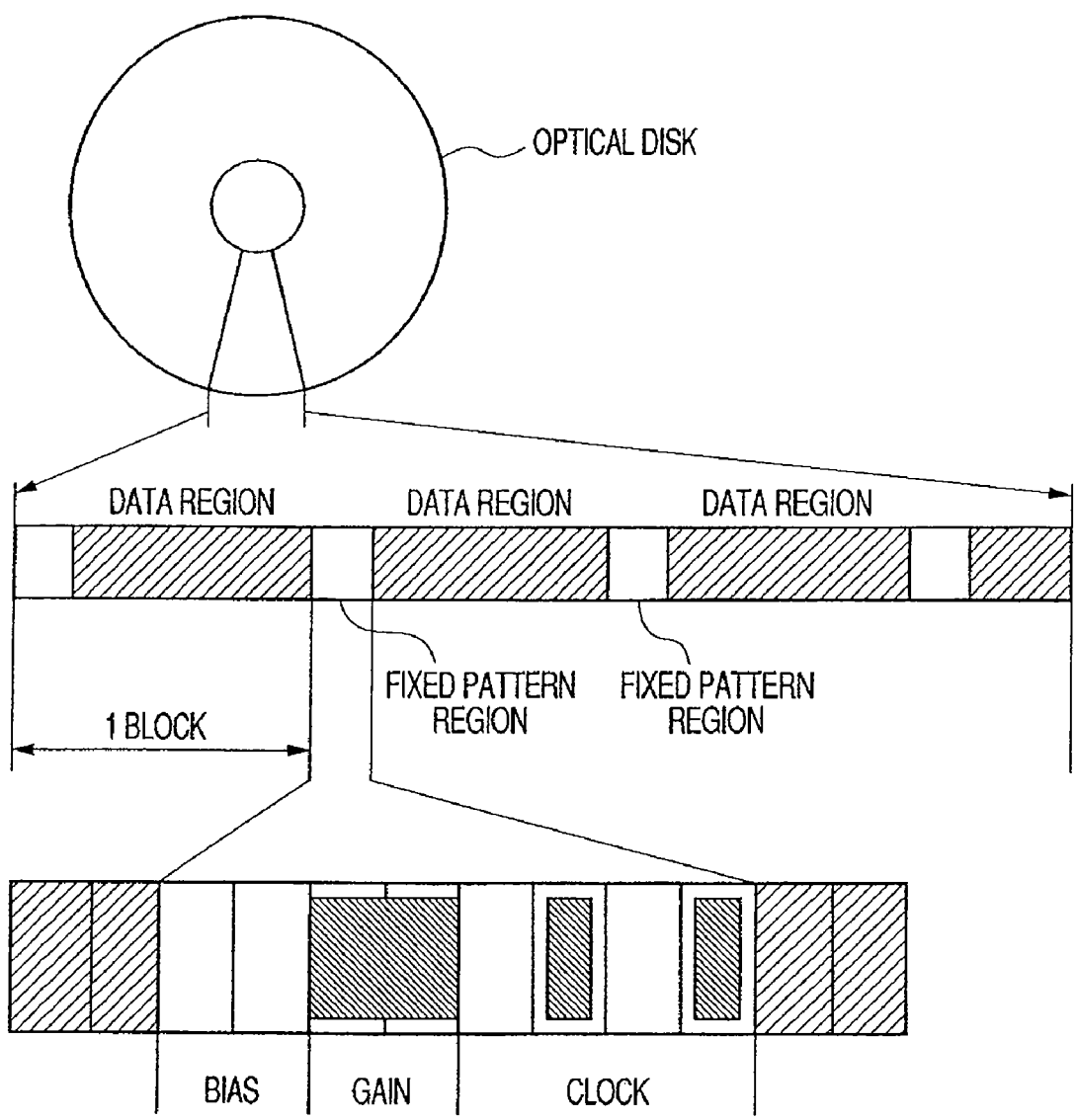
FIG. 22 is a simple diagram showing a normal block structure of a fixed pattern region for performing the AGC and the level correction in an optical disk.

FIG. 19 shows an algorithm for correcting the multi-level of the preceding cell in Step 29. First, in Step S43, the operation starts. Then, the relationship between the candidate value of the preceding cell and the candidate value of the target cell as described with reference to FIG. 18 is examined in Steps S44 to S47, to correct the finally determined value of the preceding cell.

That is, when a rule is made between the candidate value of the preceding cell and the candidate value of the target cell, it is determined that a result obtained by determination of the preceding cell is different from an actual correct value. For example, assume that the correct value of each of the preceding cell and the target cell is "3", the candidate value a' of the preceding cell is "3", and x' thereof is "2". Here, when x', which is "2", is erroneously selected as a final determination value, "a" and "x", which are the candidate values of the target cell become "3" and "4", respectively, at a high possibility.

This is expressed by the following general expression:

(a−x)<0 and (a'−x')>0 Step S44 or (a−x)>0 and (a'−x')<0 Step S45.

Therefore, when the conditions in Steps S44 and S45 are satisfied, the operation proceeds to Step S48, the preceding cell is corrected to "a'". In Step S51, the operation is completed. In this case, it is determined that x', which is "2", is erroneously selected for the preceding cell. Thus, the preceding cell is corrected to a', which is "3".

In contrast to this, the case where a' is erroneously determined as the final value of the preceding cell is examined. Assume that the correct value of each of the preceding cell and the target cell is "3", the candidate value a' of the preceding cell is "4", and x' thereof is "3". Here, when a', which is "4", is erroneously selected as the final determination value, "a" and "x", which are the candidate values of the target cell become "3" and "2", respectively, at a high possibility.

This is expressed by the following general expression:

$(a-x)>0$ and $(a'-x')>0$ Step S46 or $(a-x)<0$ and $(a'-x')<0$ Step S47.

Therefore, when the conditions in Steps S46 and S47 are satisfied, the operation proceeds to Step S49, the preceding cell is corrected to "x'". In Step S51, the operation is completed. In this case, it is determined that a', which is "4", is erroneously selected for the preceding cell. Thus, the preceding cell is corrected to x', which is "3".

The above-mentioned detailed description relates to the operation of the final value determination section as shown in FIG. 17, and the multi-level data determining method for the multi-level data determination circuit 15.

According to the present invention, the cell having a reduced multi-level value is provided in a portion of the data region. Therefore, high-density recorded multi-level information can be reproduced at a high precision without a reduction in format efficiency of a recording medium. In particular, multi-level information can be determined at a high precision without influences of not only a low frequency component, but also a noise having a frequency close to a reproduction signal frequency band.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-025596, filed Feb. 2, 2006, which is hereby incorporated by reference herein in its entirety.

What is claimed is:

1. A method of reproducing multi-level information recorded by changing one of a width and an area of an information pit in a track direction, and a phase of the information pit in virtual cells provided on a track of an optical information medium at predetermined intervals, the method comprising the steps of:
   setting the optical information medium including a plurality of cells, each of which is recorded with an information pit of a selected level of an N-value (N≧3), and a cell recorded with an information pit of a selected level of an M-value (M<N) for each group including the plurality of cells, wherein the cell recorded with the information pit of a selected level of the N-value follows the cell recorded with the information pit of a selected value of the M-value;
   obtaining a reproduction signal when a center of a light spot is moved to a center of the cell recorded with the information pit of a selected level of the M-value; and
   correcting a reproduction signal of the cell recorded with the information pit of the selected level of the N-value, based on a difference between the reproduction signal of the cell recorded with the information pit of a selected level of the M-value and a reference signal obtained from learning information.

2. The method of reproducing multi-level information according to claim 1, wherein the reference value is a cell center value obtained from the learning information, based on a multi-level determination value for determining a multi-level of a target cell recorded with the information pit of a selected level of the M-value and a multi-level determination value for a preceding cell and a following cell, which are located before and after the target cell, each of which is recorded with the information pit of a selected level of one of the M-value and the N-value.

3. The method of reproducing multi-level information according to claim 2, wherein when the target cell recorded with the information pit of a selected level of the M-value and successive cells including the preceding cell and the following cell, which are located before and after the target cell, each of which is recorded with the information pit of a selected level of one of the M-value and the N-value, are included in a single group, the learning information is obtained by learning in advance possible multi-level information of each of the cell center values in the group.

4. A method of reproducing multi-level information recorded by changing one of a width and an area of an information pit in a track direction and a phase of the information pit in virtual cells provided on a track of an optical information medium at predetermined intervals, the method comprising the steps of:
   providing a cell recorded with the information pit of a selected level of an M-value for each group including a plurality of cells, each of which is recorded with the information pit of a selected level of an N-value (N≧3, M<N);
   obtaining a reproduction signal when a center of a light spot is moved to a center of the cell recorded with the information pit of a selected level of the M-value;
   detecting a peak from a plurality of reproduction signals; and
   performing automatic gain control on the reproduction signal based on a value of the detected peak.

5. A method of reproducing multi-level information recorded by changing one of a width and an area of an information pit in a track direction and a phase of the information pit in virtual cells provided on a track of an optical information medium at predetermined intervals, the method comprising the steps of:
   setting an optical information medium including a plurality of cells, each of which is recorded with an information pit of a selected level of an N-value (N≧3), and cells recorded with successive information pits of a selected level of M-values (M<N) for each group including the plurality of cells;
   obtaining a reproduction signal when a center of a light spot is moved to an interface between a cell recorded with the information pit of a selected level of the M-value and a following cell recorded with the information pit of a selected level of the M-value; and
   correcting a reproduction signal level of a cell recorded with the information pit of a selected level of the N-value, which follows the cell recorded with the information pit of a selected level of the M-value, based on a difference between a cell boundary value and a reference value obtained from learning information.

6. The method of reproducing multi-level information according to claim 5, wherein the reference value is a cell boundary value obtained from the learning information based on multi-level determination values for the cells recorded with the successive information pits of a selected level of M-values.

7. The method of reproducing multi-level information according to claim 6, wherein when the cells recorded with the successive information pits of a selected level of M-values are included in a single group, the learning information is obtained by learning in advance possible multi-level information of each of the cell boundary values in the group.

* * * * *